(12) United States Patent
Shapira et al.

(10) Patent No.: US 11,080,199 B2
(45) Date of Patent: Aug. 3, 2021

(54) DETERMINING LOGICAL ADDRESS OF AN OLDEST MEMORY ACCESS REQUEST

(71) Applicant: International Business Machines Corporation, Armonk, NY (US)

(72) Inventors: Yossi Shapira, Shoham (IL); Jonathan Hsieh, Poughkeepsie, NY (US); Michael Cadigan, Jr., Poughkeepsie, NY (US); Jane Bartik, Poughkeepsie, NY (US); Taylor J Pritchard, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 286 days.

(21) Appl. No.: 16/295,117

(22) Filed: Mar. 7, 2019

(65) Prior Publication Data
US 2020/0285583 A1    Sep. 10, 2020

(51) Int. Cl.
*G06F 12/0875* (2016.01)
*G06F 9/50* (2006.01)
*G06F 9/30* (2018.01)
*G06F 12/12* (2016.01)

(52) U.S. Cl.
CPC ...... *G06F 12/0875* (2013.01); *G06F 9/30043* (2013.01); *G06F 9/5077* (2013.01); *G06F 12/12* (2013.01)

(58) Field of Classification Search
CPC ............. G06F 12/0875; G06F 9/30043; G06F 9/5077; G06F 12/12
See application file for complete search history.

(56) References Cited

U.S. PATENT DOCUMENTS

| 6,199,154 B1 * | 3/2001 | Witt ................. G06F 9/30021 712/205 |
| 9,317,423 B2 | 4/2016 | Tatara et al. |
| 10,156,996 B2 | 12/2018 | Hayakawa et al. |
| 10,693,808 B2 * | 6/2020 | McDonald .......... H04L 47/6285 |
| 2011/0131385 A1 * | 6/2011 | Henriksson ......... G06F 13/1642 711/158 |

(Continued)

OTHER PUBLICATIONS

Anonymous, "Optimized Aging Mechanisms for MAC Entries." IPCOM000243580; Oct. 2, 2015. pp. 15.

(Continued)

*Primary Examiner* — Tuan V Thai
(74) *Attorney, Agent, or Firm* — Cantor Colburn LLP; Margaret McNamara

(57) ABSTRACT

Embodiments of the inventions are directed towards a computer-implemented methods and systems for determining an oldest logical memory address. The method includes creating an M number of miss request registers and an N number of stations in a load/store unit of the processor. In response to load requests from target instructions, a processor detects each L1 cache miss. The processor stores data related to each L1 cache miss in a respective miss request register. The data includes an age of each L1 cache miss and a portion of a logical memory address of the requested load. The processor stores the entire logical memory addresses of the requested loads in respective stations based on an age of the load requests. The processor transmits the oldest logical memory address that is stored at the stations.

17 Claims, 4 Drawing Sheets

(56) References Cited

U.S. PATENT DOCUMENTS

2012/0072702 A1* 3/2012 Pierson ............... G06F 12/0811
                                                          712/207
2020/0125285 A1* 4/2020 Byun .................... G06F 3/0604

OTHER PUBLICATIONS

Anonymous, "System and Method for Identifying Obsolete Files on a File System," ip.com: Sep. 2, 2011. pp. 4.
J. Doweck, "Inside Intel Core" Microarchitecture and Smart Memory Access, Intel. 2017. pp. 12.

* cited by examiner

DETERMINING LOGICAL ADDRESS OF AN OLDEST MEMORY ACCESS REQUEST

BACKGROUND

The present invention generally relates to data transmission and more specifically, to a load/store unit that determines the logical address among more than one missed level 1 (L1) cache requests.

To meet modern demands, processors are being designed using techniques or combinations of techniques to increase the number of instructions that can be executed per second. These techniques include providing multiple execution units and parallel processing. Another technique, pipeline processing involves overlapping the execution of different instructions using pipeline stages. Each pipeline stage executes a portion of the instructions and then passes the instructions to the next stage. While each instruction still executes in the same amount of time, the overlapping of instruction execution enables improved effective execution rates.

As processors employ more complex configurations and instruction pipelines, issues related to memory storage are increased in magnitude and frequency. To improve data retrieval, processors use multilevel caches to decrease memory latency, however, access to these caches impacts overall processor performance.

Processors initiate data transfers between a processor and memory. Load operations involve transferring data from the main memory to cache and store operations involve transferring data from cache memory to the main memory. For some instructions, memory operations can be included in the instructions to directly accesses and operate on a memory operand to execute a desired function. In other situations, instruction functions are for transferring data only. Typically, memory operations specify a memory address generated from one or more operand of a memory operation. The memory addresses include load addresses, in which data is loaded at the address in the cache. The memory addresses also includes store addresses, in which data is stored at an address in main memory.

SUMMARY

Embodiments of the present invention are directed to a computer-implemented method for determining the logical memory address of the oldest load request. A non-limiting example of the computer-implemented method includes creating an M number of miss request registers and an N number of stations in a load/store unit of the processor. In response to load requests from target instructions, a processor detects each L1 cache miss. The processor stores data related to each L1 cache miss in a respective miss request register. The data includes an age of each L1 cache miss and a portion of a logical memory address of the requested load. The processor stores the entire logical memory addresses of the requested loads in respective stations based on an age of the load requests. The processor transmits the logical memory address that is stored at the stations.

Embodiments of the present invention are further directed to a computer system for distributed learning. The computer system includes a memory and a hardware processor system communicatively coupled to the memory. The processor system is configured to perform the computer-implemented method.

Embodiments of the present invention are further directed to a computer program product for distributed learning. The computer product comprises a computer readable storage medium embodied with program instructions. The instructions are executable by a hardware processor and cause the hardware processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
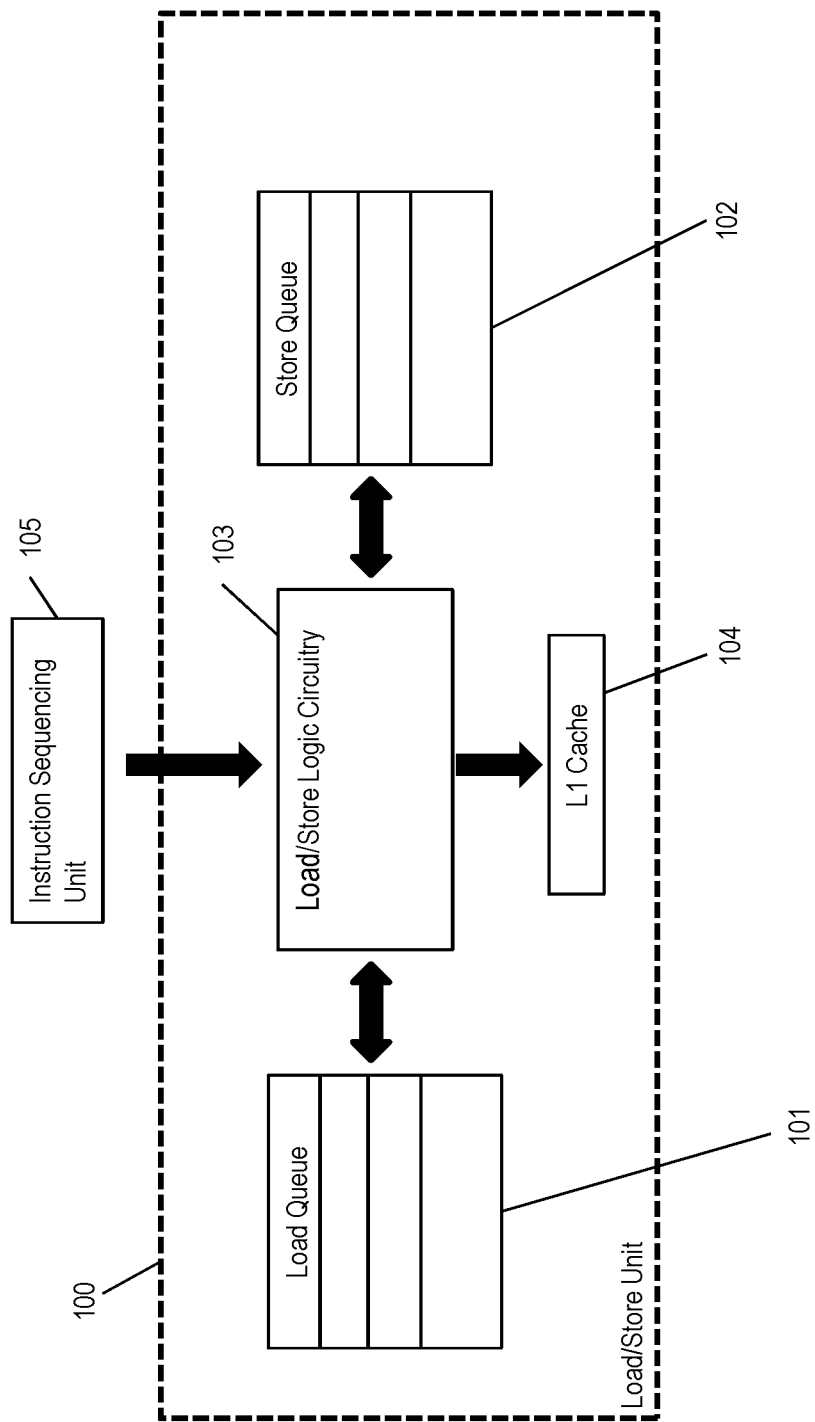
FIG. 1 depicts a block diagram of a general load/store unit according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

A load/store unit (LSU) is responsible for managing memory operations for transferring data to and from main memory. The LSU loads data from main memory to a register and stores data from a register to main memory. An LSU typically includes logic circuits, queues, memory buffers, and has access to a multilevel data cache. The logic circuits decode any received load or store instructions to determine the instruction type, instruction address, and a description of the requested load. The LSU searches the data cache to fetch the requested load.

In the event that the requested data is not found in the L1 cache, the LSU proceeds to a higher level in the cache hierarchy, for example, L2 cache, to find the requested load. Information regarding the request load miss is stored in a miss request register (MRR). In conventional LSUs, this information includes the operand logical address of the requested load. A typical LSU can create and accommodate several MRRs to track cache misses.

Performance evaluation algorithms review this information to extract cache performance-related parameters such as cache miss ratio and cache miss latency. In some instances, a processor's performance is assessed in relation to a target group of instructions. In this situation, the assessment includes determining the operand logical address of the oldest outstanding memory access or load request for the target instructions. To keep track of miss requests, conventional LSUs either create a new MRR for each new miss request or update an existing MRR that happens to be holding the same operand logical address from a previous miss request. However, in both situations, the MRR must store the entire operand logical address, which in conventional systems can be 64 bits in length. As a result, both the costs of storing the addresses and the power consumed by the system increase as the number of MRRs increase.

Turning now to an overview of the aspects of the invention, one or more embodiments of the invention address the above-described shortcomings of the prior art by providing an LSU that has stations that hold a limited number of operand logical addresses instead of each entire operand logical address.

Referring to FIG. 1, an exemplary embodiment of an LSU unit 100 is shown. The LSU 100, in this embodiment, comprises a load queue 101, a store queue 102, load/store logic circuitry 103 and an L1 cache 104. The load queue 101 and the store queue 102 each comprise entries that, respectively, track additional information associated with outstanding load and store instructions. The load/store logic circuitry 103 receives load and store instructions from the instruction sequencing unit (ISU) 105 and executes the load and store instructions. In general, each load instruction includes address information specifying an address of a requested load.

Figure 2:
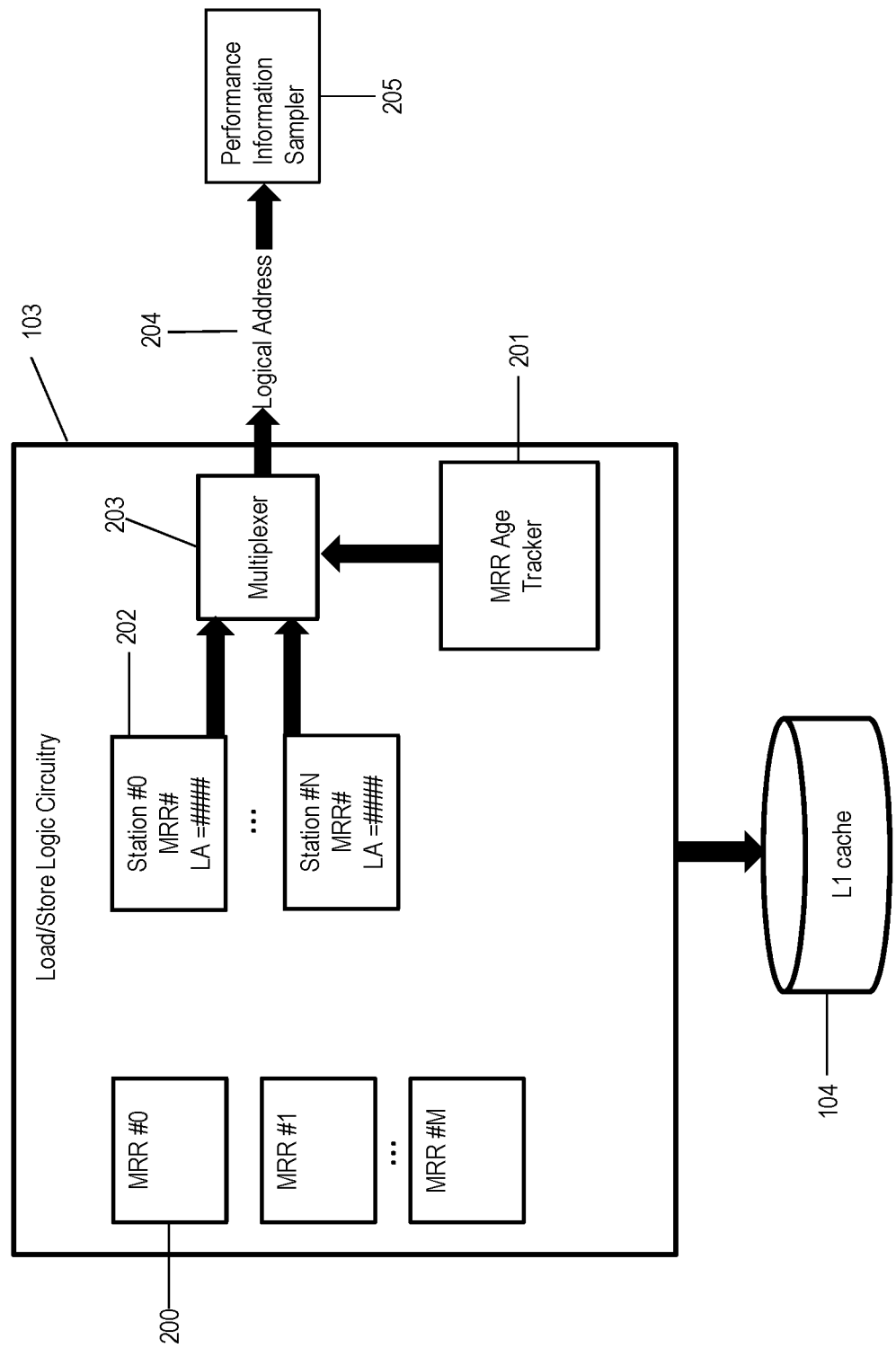
FIG. 2 depicts a block diagram of logic circuitry for a load/store unit according to one or more embodiments of the present invention.

Referring to FIG. 2, a system for storing the operand logical address of the oldest outstanding load request according in embodiments of the present invention is shown. The LSU unit includes logic circuitry 103 that is in operable communication with an L1 cache 104. The LSU logic circuitry 103 includes M number of MRRs 200, an MRR age tracker 201, N number of stations 202, and a multiplexer 203. The LSU unit can include any number of MRRs and any number of stations, however, the number of MRRs is greater than the number of stations (i.e., M>N). The multiplexer is configured to output the operand logical address 204 from a station 202 based on an age determination by the MRR age tracker 201. In some embodiments, the logical address 204 is transmitted to a performance information sampler 205.

In an initial state, all the MRRs 200 are in an invalid state to indicate that a miss request has not occurred. In some embodiments, each MRR 200 includes a state bit to convey the current state of the MRR 200. For example, a 0-bit value describes an invalid state and 1-bit value describes a valid state. Each station 202 is initially holding a 0-bit as the stations are not holding any operand logical addresses.

When the LSU unit receives instructions to load data to a register, the LSU unit searches the L1 cache 104 to fetch the data. In the event, that the L1 cache 104 is not holding the data, the LSU moves to a higher level in the cache hierarchy to find the data. If the data is not located in the cache, the LSU will load the data from main memory to cache. The cache miss at the L1 cache 104 triggers a miss request which is recorded at an MRR. Although FIG. 2 illustrates a sequence of MRRs from MRR #0 to MRR #M, any MRR 200 can be used to record the miss request, for example, MRR #3 could be the first MRR 200 used to record the miss request. In a conventional LSU, an MRR would hold the entire operand logical address of the requested load. However, in the herein described system, the MRR 200 holds a portion of operand logical address and the processor amends the MRR state bit to 1 to indicate that the MRR 200 is valid. The portion of the operand logical address has fewer bits than the entire operand logical address. In some embodiments, the MRR 200 holds the portion of the memory address that indicates a congruence class. The MRR age tracker 201 reads the state bit and initiates a sequential aging list of the miss requests. The method to track the age of the miss request can be performed through various methods. For example, the MRR age tracker 201 assigns each miss request an "age id" which begins at 0 for the oldest miss request and sequentially increases for each miss request to M. The MRR age tracker 201 stores the identity of the MRR 200 and an age of the miss request.

The LSU stores a portion of the memory address associated with the miss request in an MRR 200 and stores the entire memory address in a station 202. FIG. 2 shows the stations in sequence from station #0 to station #N, however, any station can be chosen to store the operand logical address. The herein described LSU includes M number of MRRs and N number of stations. However, to reduce space and conserve power, the number of stations 202 are fewer than the number of MRRs 200. Each of the stations 202 is continuously outputting its stored operand logical address to the multiplexer 203. The MRR age tracker 201 is in operable communication with the select lines of the multiplexer 203 and selects the station 202 with the operand logical address of the oldest outstanding load request. The LSU continues to monitor miss requests and loads the miss request for the operand logical address of the next oldest outstanding load request into another station 202.

In some embodiments, the LSU is configured to detect load requests for a target group of instructions. In these instances, the MRR age tracker 201 still maintains an aging list of the miss requests. However, the stations 202 are not updated unless the miss request is for a load requested for at least one of the target instructions. The multiplexer 203 would continue to output the operand logical address associated with the target instructions.

As described earlier, the LSU initially accesses the L1 cache 104 to find the target load, then each higher level of cache, and finally the main memory. Once the load is fetched, the LSU no longer stores the miss request data at the MRR 200. Once the load request has been responded to, the LSU updates the status bit to 0 and the MRR 200 enters an invalid state. The LSU also updates the MRR age tracker 201, by removing the MRR entry from the aging list. If one of the stations was holding the operand logical address associated with the MRR 200, the LSU updates the status bit to 0 and the station enters an invalid state. The LSU then reviews the aging list on the MRR age tracker 201 and determines the MRR 200 associated with the operand logical address of the next oldest outstanding load request. The LSU updates the state bit to reflect a valid state and the operand logical address of the next oldest outstanding load request is stored in the station.

Periodically, the target set of instructions requests a load, in which the load was initially requested by a set of non-target instructions and an initial miss request instantiated an MRR 200. To make this determination, the LSU can compare the memory address of the requested load with the portion of the memory address stored at the MRR 200. In this instance, an MRR 200 still exists for the earlier miss request. The MRR sequence of the MRR age tracker 201 remains the same. The MRR age tracker 201 updates the age list to show that the MRR reference identification is associated with a miss request for a load for the target set of instructions. The MRR age tracker 201 then compares the age of the initial miss request stored in the MRR with the age of the miss requests of the MRRs referenced at each station. If the age of the initial miss requests is older than any of the miss requests of the MRRs referenced by the stations, the station 202 is updated to reference the MRR and include the operand logical address of the requested load. If the initial miss request is younger than the youngest miss request of the MRRs referenced by the stations, the LSU does not update the stations. Therefore, the LSU updates the station 202 even if the miss request for the target set of instructions is younger than the youngest miss request of the MRRs referenced by the stations.

If any station has been updated, the MRR age tracker 201 compares the miss request ages and either continues to select the same station or selects a new station based on the oldest miss request. For example, the MRR age tracker compares the MRR references in the stations to the MRR references in the aging list to determine the oldest miss request. The MRR selects the oldest miss request and the multiplexer outputs the associated logical address.

Figure 3:
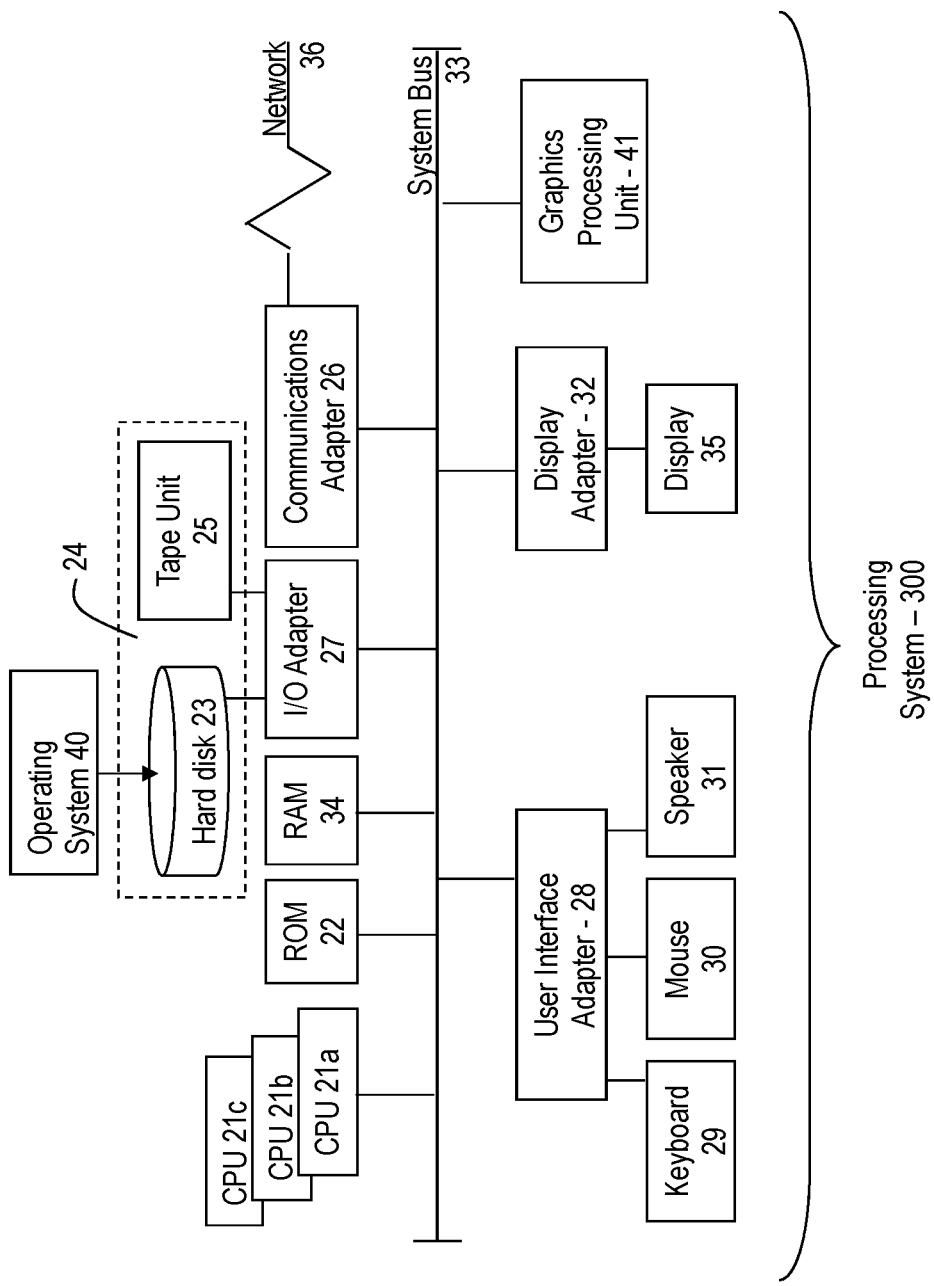
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Figure 4:
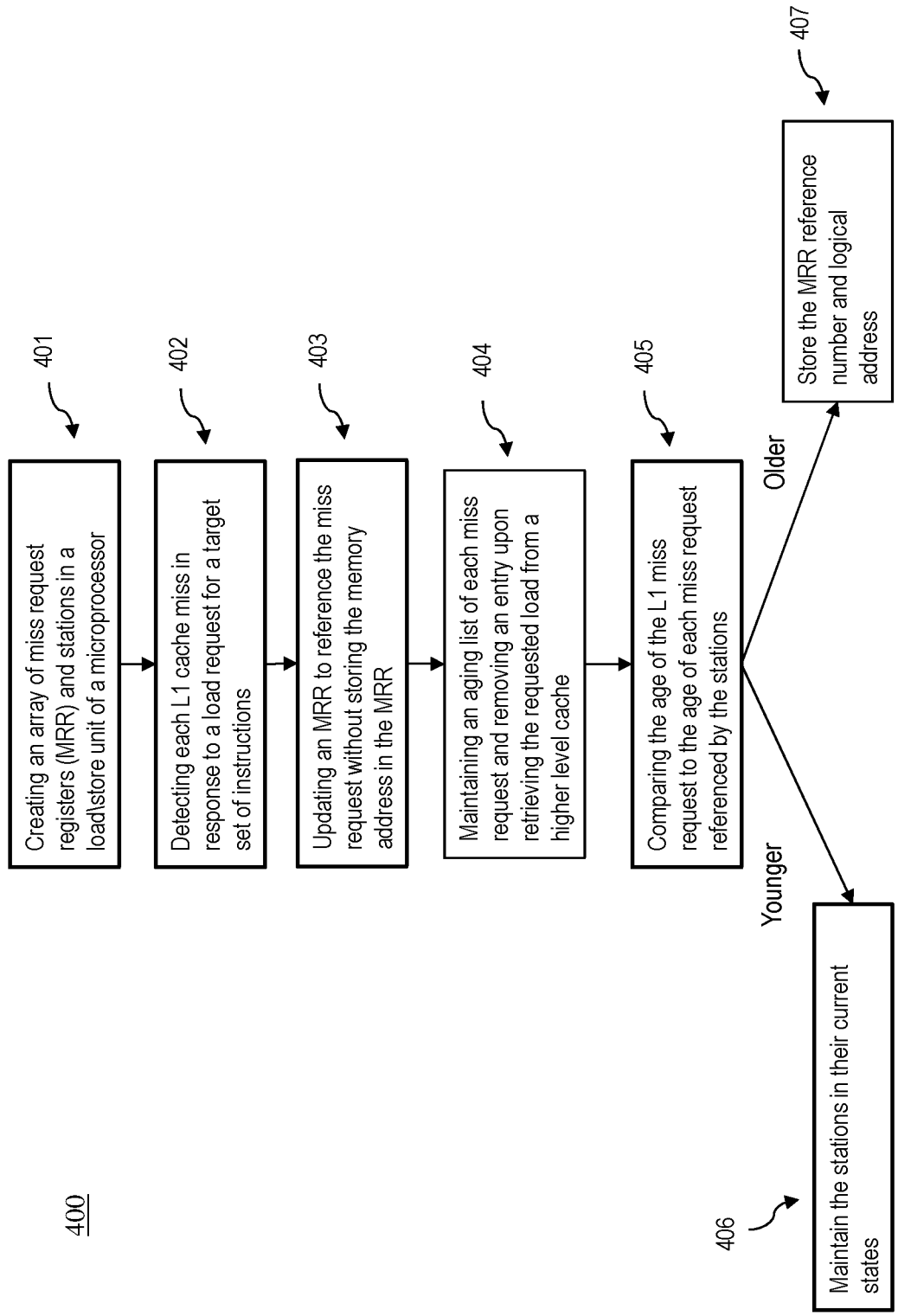
FIG. 4 depicts a flow diagram of a method for determining the logical address of the oldest outstanding load request according to one or more embodiments of the invention.

FIG. 4 depicts a flow diagram of a method for determining a logical address of the oldest outstanding load request according to one or more embodiments of the invention. The method 400 includes creating an array of miss request registers and stations in a load store unit of a microprocessor at block 401. In response to a load request, the LSU detects each L1 cache miss request for a target set of instructions at block 402. Upon detecting a miss request, an MRR is updated to reference the miss request at block 403. Unlike conventional MRRs, only a portion of the memory address of the requested load is stored in the MRR. If each MRR has previously been updated, the system is configured to create an additional MRR. In other embodiments, the system is configured update an MRR by replacing previously stored miss request information.

The system maintains an aging list, for example, a counter, of the age of the miss requests referenced by each MRR at block 404. The aging list includes a reference marker, for example, a numerical identification, of each MRR in sequential aging order. In addition to age, the system identifies each miss request for a load request related to target instructions. Optimization algorithms for processors collect data related to miss requests. To further improve the optimization of a processor, algorithms focus only on miss requests related to target instructions. The system compares the age of the miss request to each age of each miss request referenced by the stations at block 405. If the miss request is younger than the age requests, the stations maintain their current state at block 406. If, however, the miss request is older than any of the miss requests referenced by the stations, the station referencing the youngest miss request is updated to reference the older miss request at block 407. The LSU outputs the logical address of the oldest outstanding load request. This information is us used by a performance optimizing algorithm.

Additional processes may also be included. It should be understood that the processes depicted in FIG. 4 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for determining a logical address of an oldest load request, the method comprising:
    creating, by a processor, an M number of miss request registers and an N number of stations in a load/store unit of the processor;
    detecting, by the processor, each level 1 (L1) cache miss in response to respective load requests, wherein the respective load requests are for target instructions and non-target instructions;
    storing, by the processor, data related to each L1 cache miss in a respective miss request register, wherein the data includes an age of each L1 cache miss and a portion of a logical memory address of each respective requested load;
    storing, by the processor, logical memory addresses of the requested loads in respective stations based on an age of the load requests; and
    transmitting a logical memory address of an oldest load request stored at a station.

2. The computer-implemented method of claim 1, wherein the M number of miss request registers is greater than the N number of stations.

3. The computer-implemented method of claim 1 further comprising maintaining a list comprising entries of each age of a respective L1 cache miss, wherein the list further annotates L1 cache misses resulting from load requests from the target instructions.

4. The computer-implemented method of claim 3 further comprising removing an entry in response to retrieving the requested load from a higher level cache or system memory.

5. The computer-implemented method of claim 4 further comprising replacing memory addresses related to younger L1 cache misses with memory addresses of older L1 cache misses.

6. The computer-implemented method of claim 5, wherein the stations only store memory addresses of requested loads from target instructions.

7. A system for determining a logical address of an oldest outstanding load request, the system comprising:
    a processor communicatively coupled to a memory, the processor configured to:
        create an M number of miss request registers and an N number of stations in a load/store unit of the processor;
        detect each level 1 (L1) cache miss in response to respective load requests, wherein the respective load requests are for target instructions and non-target instructions;
        store data related to each L1 cache miss in a respective miss request register, wherein the data includes an age of each L1 cache miss and a portion of a logical memory address of each respective requested load;
        store logical memory addresses of the requested loads in respective stations based on an age of the load requests; and
        transmit an oldest logical memory address stored at a station.

8. The system of claim 7, wherein the M number of miss request registers is greater than the N number of stations.

9. The system of claim 7, wherein the processor is further configured to maintain a list comprising entries of each age of a respective L1 cache miss, wherein the list further annotates L1 cache misses resulting from load requests from the target instructions.

10. The system of claim 9, wherein the processor is further configured to remove an entry in response to retrieving the requested load from a higher level cache or system memory.

11. The system of claim 10, wherein the processor is further configured to replace memory addresses related to younger L1 cache misses with memory addresses of older L1 cache misses.

12. The system of claim 11, wherein the stations only store memory addresses for requested loads from target instructions.

13. A computer program product for determining a logical address of an oldest outstanding memory request, the computer product comprising a computer readable storage medium having program instructions embodied therewith, the instructions executable by a processor to cause the processor to:
- create an M number of miss request registers and an N number of stations in a load/store unit of the processor;
- detect each level 1 (L1) cache miss in response to respective load requests, wherein the respective load requests are for target instructions and non-target instructions;
- store data related to each L1 cache miss in a respective miss request register, wherein the data includes an age of each L1 cache miss and a portion of a logical memory address of each respective requested load;
- store logical memory addresses of the requested loads in respective stations based on an age of the load requests; and
- transmit an oldest logical memory address stored at a station.

14. The computer program product of claim 13, wherein the M number of miss request registers is greater than the N number of stations.

15. The computer program product of claim 13, wherein the processor is further configured to maintain a list comprising entries of each age of a respective L1 cache miss, wherein the list further annotates L1 cache misses resulting from load requests from the target instructions.

16. The computer program product of claim 15, wherein the processor is further configured to remove an entry in response to retrieving the requested load from a higher level cache or system memory.

17. The computer program product of claim 16, wherein the processor is further configured to replace memory addresses related to younger L1 cache misses with memory addresses of older L1 cache misses.

* * * * *